US011682167B2

(12) United States Patent
Yarus et al.

(10) Patent No.: US 11,682,167 B2
(45) Date of Patent: Jun. 20, 2023

(54) SEAMLESS SCALING GEOMODELING

(71) Applicant: Landmark Graphics Corporation, Houston, TX (US)

(72) Inventors: Jeffrey Marc Yarus, Houston, TX (US); Rae Mohan Srivastava, Toronto (CA); Yevgeniy Zagayevskiy, Houston, TX (US); Gaetan Bardy, Spring, TX (US); Maurice Gehin, Houston, TX (US); Genbao Shi, Sugarland, TX (US)

(73) Assignee: Landmark Graphics Corporation, Houston, TX (US)

( * ) Notice: Subject to any disclaimer, the term of this patent is extended or adjusted under 35 U.S.C. 154(b) by 37 days.

(21) Appl. No.: 16/753,945

(22) PCT Filed: Dec. 20, 2018

(86) PCT No.: PCT/US2018/066899
§ 371 (c)(1),
(2) Date: Apr. 6, 2020

(87) PCT Pub. No.: WO2020/131078
PCT Pub. Date: Jun. 25, 2020

(65) Prior Publication Data
US 2021/0225071 A1    Jul. 22, 2021

(51) Int. Cl.
*G06T 17/05*    (2011.01)
*G06F 16/29*    (2019.01)
*G06T 19/20*    (2011.01)

(52) U.S. Cl.
CPC .............. *G06T 17/05* (2013.01); *G06F 16/29* (2019.01); *G06T 19/20* (2013.01)

(58) Field of Classification Search
CPC ......... G06T 17/05; G06T 19/20; G06T 11/00; G06F 16/29; G01V 99/005; G01V 1/28;
(Continued)

(56) References Cited

U.S. PATENT DOCUMENTS

| 7,075,558 B2 | 7/2006 | Watanabe et al. |
| 8,587,617 B2 | 11/2013 | Hoff et al. |

(Continued)

FOREIGN PATENT DOCUMENTS

| WO | 2014182331 | 11/2014 |
| WO | 2017213631 | 12/2017 |

(Continued)

OTHER PUBLICATIONS

Jones, R. R., et al. "Integration of regional to outcrop digital data: 3D visualisation of multi-scale geological models." Computers & Geosciences 35.1 (2009): 4-18.*

(Continued)

*Primary Examiner* — Ryan M Gray
(74) *Attorney, Agent, or Firm* — Michael Jenney; C. Tumey Law Group PLLC

(57) ABSTRACT

A method for creating a seamless scalable geological model may comprise identifying one or more geological scales, establishing a geological tied system, identifying one or more graphical resolution levels for each of the one or more geological scales, constructing the seamless scalable geological model, and producing a post-process model. A system for creating a seamless scalable geological model may comprise an information handling system, which may comprise a random access memory, a graphics module, a main memory, a secondary memory, and one or more processors configured to run a seamless scalable geological model software.

20 Claims, 4 Drawing Sheets

(58) Field of Classification Search
CPC . G01V 1/48; G01V 3/38; G01V 99/00; G06Q 50/02
See application file for complete search history.

(56) References Cited

U.S. PATENT DOCUMENTS

| | | | | |
|---|---|---|---|---|
| 10,795,053 | B2* | 10/2020 | Dulac | G01V 99/005 |
| 11,481,998 | B2* | 10/2022 | Lin | G06T 15/005 |
| 2006/0136162 | A1 | 6/2006 | Hamman et al. | |
| 2006/0277012 | A1 | 12/2006 | Richard et al. | |
| 2011/0054857 | A1 | 3/2011 | Maguchaya | |
| 2011/0131015 | A1 | 6/2011 | Yarus et al. | |
| 2011/0205844 | A1* | 8/2011 | Maucec | G06T 17/00 367/43 |
| 2011/0264430 | A1* | 10/2011 | Tapscott | G01V 99/00 703/10 |
| 2012/0035896 | A1* | 2/2012 | Wu | E21B 43/00 703/2 |
| 2013/0018642 | A1* | 1/2013 | Mifflin | G05B 17/02 703/10 |
| 2013/0332125 | A1* | 12/2013 | Suter | G01V 99/00 703/6 |
| 2013/0339891 | A1 | 12/2013 | Blumenberg et al. | |
| 2016/0168959 | A1 | 6/2016 | Yarus et al. | |
| 2017/0275970 | A1* | 9/2017 | Crawford | G01V 99/005 |
| 2017/0315249 | A1* | 11/2017 | Myers | G01V 99/005 |
| 2021/0225071 | A1* | 7/2021 | Yarus | G01V 99/005 |

FOREIGN PATENT DOCUMENTS

| | | |
|---|---|---|
| WO | 2017213631 A1 | 12/2017 |
| WO | 2018045255 | 3/2018 |
| WO | 2018045255 A1 | 3/2018 |

OTHER PUBLICATIONS

Xiong, Ziming, et al. "A 3D multi-scale geology modeling method for tunnel engineering risk assessment." Tunnelling and Underground Space Technology 73 (2018): 71-81.*

Ringrose, Philip S., Allard W. Martinius, and Jostein Alvestad. "Multiscale geological reservoir modelling in practice." Geological Society, London, Special Publications 309.1 (2008): 123-134.*

Zagayevskiy et al.; Multivariate grid-free geostatistical simulation with point or block scale secondary data; Sep. 19, 2015; Springer-Verlag (Year: 2015).*

Tahmasebi et al.; Accelerating pattern-based geostatistical simulation of categorical variables using a multi-scale search in Fourier space; Mar. 19, 2014; Computers & Geosciences 67; pp. 75-88 (Year: 2014).*

Oliaei et al.; "A coupled hydro-mechanical analysis for prediction of hydraulic fracture propagation in saturated porous media using EFG mesh-less method"; 2013; Computers and Geotechnics; pp. 254-266 (Year: 2013).*

Srivastava et al.; "Grid-less Simulation of a Fluvio-Deltaic Environment"; May 2013; CSPG/CSEG/CWLS GeoConvention; (Year: 2013).*

ISRWO International Search Report and Written Opinion for PCT/US2018/066899 dated Sep. 18, 2019.

* cited by examiner

SEAMLESS SCALING GEOMODELING

BACKGROUND

Oil and gas exploration may require the analysis and imaging of three-dimensional ("3D") volume data sets. Currently, volume data sets may be prepared for specific types of oil and gas exploration throughout the entire cycle of an oil and gas field development from exploration to production. For example, a volume and data set may be created for exploration, which may take into a large area of land, such as a continent. During production, a volume and data set may be created for a very precise area of land, such as an underground formation. Currently, each volume and data set has to be constructed individually and does not transfer between volume sets. A scalability feature of a geological model that may switch between volume and data sets seamlessly may be beneficial.

BRIEF DESCRIPTION OF THE DRAWINGS

These drawings illustrate certain aspects of some examples of the present disclosure, and should not be used to limit or define the disclosure.

DETAILED DESCRIPTION

Provided are systems and methods for developing a concept that may allow constructing a seamlessly scalable geological model of Earth, from planet scale to a pore scale. Such model may allow examining geological properties of the planet at various scales consistent with each other. Each scale may highlight certain features of the geology that may be suited for current geological and engineering tasks and objectives. For example, coarse scale representation of the geology may be used for oil and gas exploration, while fine scale representation of system under study may be used to predict production rates by coupling the geomodel with the flow simulator. In examples, the seamlessly scalable geological model may be implemented on an information handling system.

Figure 1:
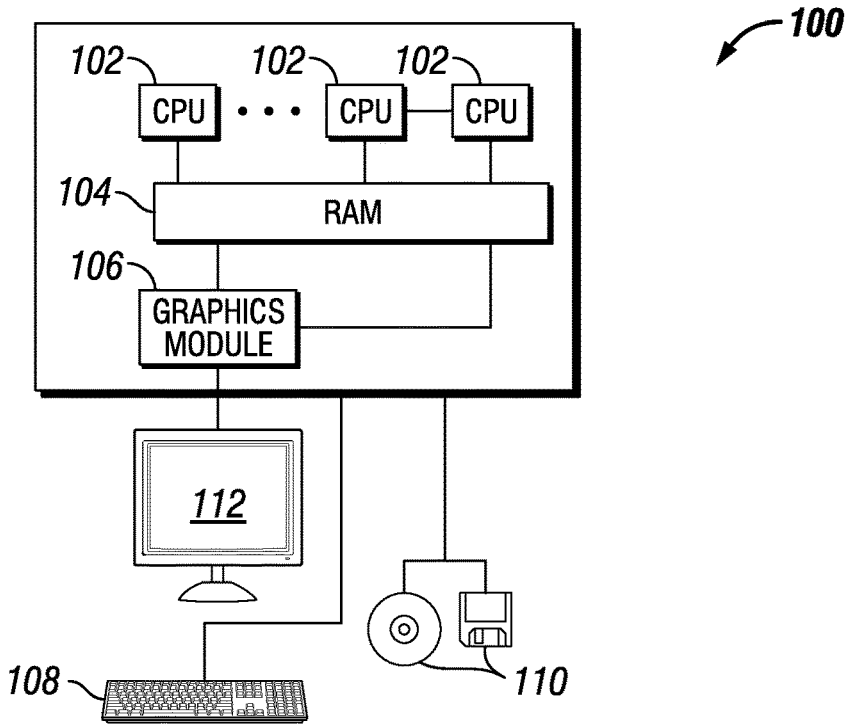
FIG. 1 illustrates an example of an information handling system.

FIG. 1 generally illustrates an example of an information handling system 100 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 120 may be a personal computer, a network storage device, or any other suitable device and may vary in size, shape, performance, functionality, and price. In examples, information handling system 100 may be referred to as a supercomputer or a graphics supercomputer. As illustrated, information handling system 100 may include one or more central processing units (CPU) or processors 102. Information handling system 100 may also include a random access memory (RAM) 104 that may be accessed by processors 102. It should be noted information handling system 100 may further include hardware or software logic, ROM, and/or any other type of nonvolatile memory. Information handling system 100 may include one or more graphics modules 106 that may access RAM 104. Graphics modules 106 may execute the functions carried out by a Graphics Processing Module (not illustrated), using hardware (such as specialized graphics processors) or a combination of hardware and software. A user input device 108 may allow a user to control and input information to information handling system 100. Additional components of the information handling system 100 may include one or more disk drives, output devices 112, such as a video display, and one or more network ports for communication with external devices as well as a user input device 108 (e.g., keyboard, mouse, etc.). Information handling system 100 may also include one or more buses operable to transmit communications between the various hardware components.

Alternatively, systems and methods of the present disclosure may be implemented, at least in part, with non-transitory computer-readable media. Non-transitory computer-readable media may include any instrumentality or aggregation of instrumentalities that may retain data and/or instructions for a period of time. Non-transitory computer-readable media may include, for example, storage media 110 such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Figure 2:
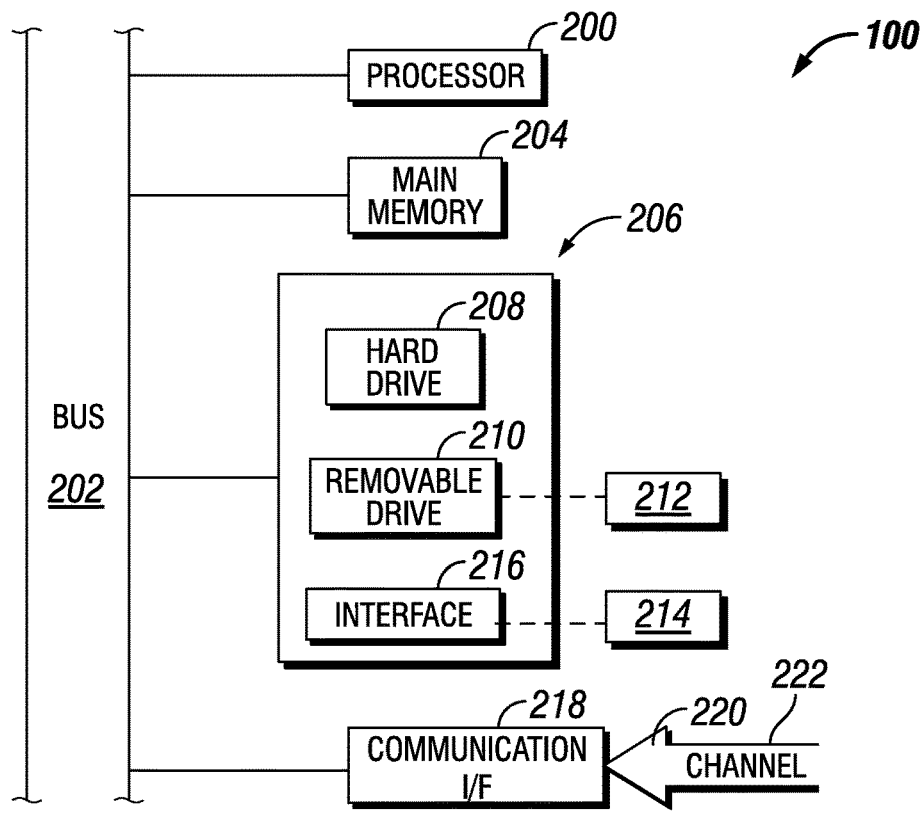
FIG. 2 illustrates another more detail example of the information handling system.

FIG. 2 illustrates additional detail of information handling system 100. For example, information handling system 100 may include one or more processors, such as processor 200. Processor 200 may be connected to a communication bus 2002. Various software embodiments are described in terms of this exemplary computer system. After reading this description, it will become apparent to a person skilled in the relevant art how to implement the example embodiments using other computer systems and/or computer architectures.

Information handling system 100 may also include a main memory 204, preferably random access memory (RAM), and may also include a secondary memory 206. Secondary memory 206 may include, for example, a hard disk drive 208 and/or a removable storage drive 210, representing a floppy disk drive, a magnetic tape drive, an optical disk drive, etc. Removable storage drive 210 may read from and/or writes to a removable storage unit 212 in any suitable manner. Removable storage unit 212, represents a floppy disk, magnetic tape, optical disk, etc. which is read by and written to by removable storage drive 210. As will be appreciated, removable storage unit 212 includes a computer usable storage medium having stored therein computer software and/or data.

In alternative embodiments, secondary memory 206 may include other operations for allowing computer programs or other instructions to be loaded into information handling system 100. For example, a removable storage unit 214 and an interface 216. Examples of such may include a program cartridge and cartridge interface (such as that found in video game devices), a removable memory chip (such as an EPROM, or PROM) and associated socket, and other removable storage units 214 and interfaces 216 which may allow software and data to be transferred from removable storage unit 214 to information handling system 100.

In examples, information handling system 100 may also include a communications interface 218. Communications interface 218 may allow software and data to be transferred between information handling system 100 and external devices. Examples of communications interface 218 may include a modem, a network interface (such as an Ethernet card), a communications port, a PCMCIA slot and card, etc. Software and data transferred via communications interface 218 are in the form of signals 220 that may be electronic, electromagnetic, optical or other signals capable of being received by communications interface 218. Signals 220 may be provided to communications interface via a channel 222. Channel 222 carries signals 220 and may be implemented using wire or cable, fiber optics, a phone line, a cellular phone link, an RF link and/or any other suitable communications channels.

In this document, the terms "computer program medium" and "computer usable medium" are used to generally refer to media such as removable storage unit 212, a hard disk installed in hard disk drive 208, and signals 220. These computer program products may provide software to computer system 1402.

Computer programs (also called computer control logic) may be stored in main memory 204 and/or secondary memory 206. Computer programs may also be received via communications interface 218. Such computer programs, when executed, enable information handling system 100 to perform the features of the example embodiments as discussed herein. In particular, the computer programs, when executed, enable processor 200 to perform the features of the example embodiments. Accordingly, such computer programs represent controllers of information handling system 100.

In examples with software implementation, the software may be stored in a computer program product and loaded into information handling system 100 using removable storage drive 210, hard disk drive 208 or communications interface 218. The control logic (software), when executed by processor 200, causes processor 200 to perform the functions of the example embodiments as described herein.

In examples with hardware implementation, hardware components such as application specific integrated circuits (ASICs). Implementation of such a hardware state machine so as to perform the functions described herein will be apparent to persons skilled in the relevant art(s). It should be noted that the disclosure may be implemented at least partially on both hardware and software.

Information handling system 100, described above in FIGS. 1 and 2, may be utilized for geological data assimilation into a single scalable model, where assimilated data may be measured at various scales. A resulting viewable product may be a geological model, which may be scalable, zoomable, and may include hierarchical relationships between model properties which may span through scales.

Figure 3A:
FIGS. 3A-3E illustrate different geological scales of a geomodel.
Figure 3B:
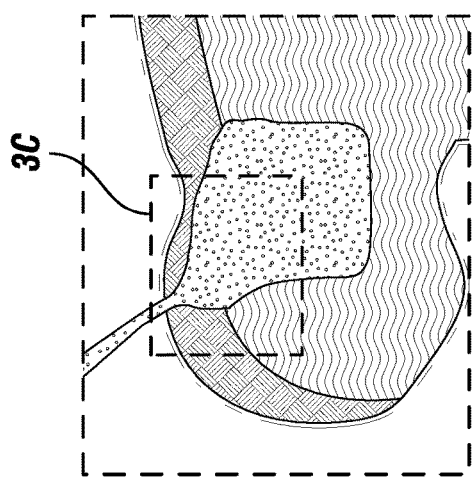
Figure 3C:
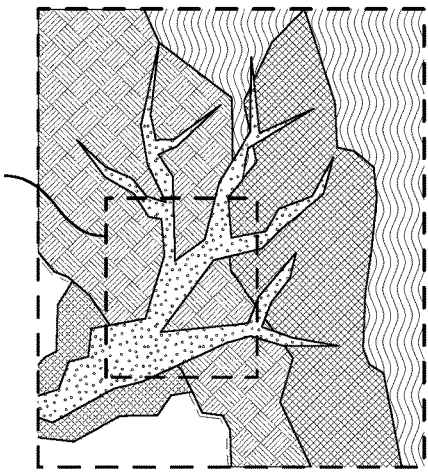
Figure 3D:
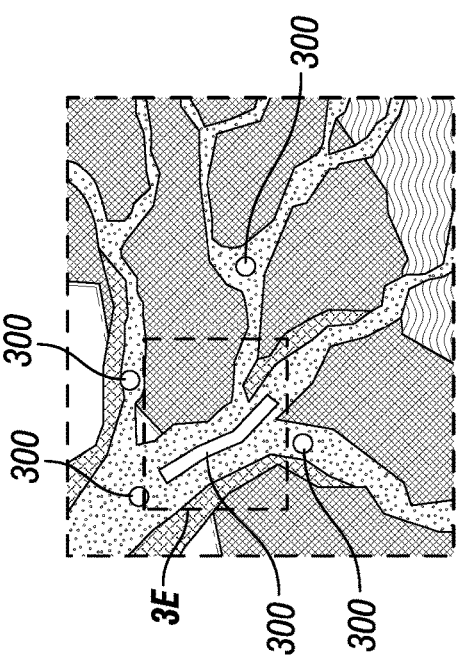
Figure 3E:
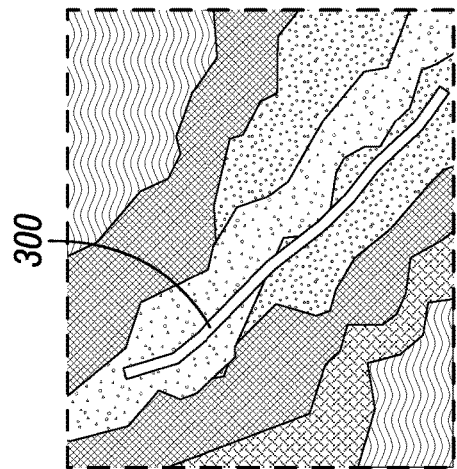

In examples, a geological scale is the level of the detail a model contains regarding the geology of studied area or volume of the planet. A coarse scale model highlights only general features of an examined system. A fine scale model contains much more detail on the examined system. Same area or volume of the planet may be examined at various scales, which should be consistent with each over in a certain manner. A geomodeling method, discussed below, may be able to build such model that may represent geology at various scales in a consistent manner, where transition between scales appears seamless. Examples of five possible scales are shown in FIGS. 3A to 3E, which may constitute a geomodel in a seamless scaling way. In FIGS. 3A to 3E, the Gulf of Mexico is depicted schematically. In examples, a particular geological element may be represented by color and/or hatching. Furthermore wells 300 may be representative of wells drilled either vertically or horizontally. The scales are organized from a coarse scale to fine scale. For example FIG. 3A is a global/planet scale, FIG. 3B is a regional scale, FIG. 3C is a basin scale, FIG. 3D is a reservoir scale, and FIG. 4 E is a well scale. This transition between scales may be defined as "zooming-in," when the model's scale changes from a coarse scale to a fine scale, and "zooming-out" may be defined as when the model's scale changes a fine scale to a coarse scale. In examples, a geomodel may be constructed in a two-dimensional space, a three-dimensional space, and/or both.

Within the geomodel, each scale may be defined by a certain set of geological units or attributes. The geological units and attributes for all scales form a tiered system, elements within which may be consistent with each other. An example of the tiered system is shown in Table 1, as seen below, which may be based on FIGS. 3A to 3E. The geological units may be primarily described by categorical variables. Petrophysical properties of a geological unit may be described as continuous variables. As seen in Table 1, 'continent' unit at global scale is illustrated in FIG. 1A. The 'continent' is represented by 'continental setting' and 'deltaic system' at a regional scale as shown in FIG. 1B, respectively. Note that the strict boundary between 'continent' and 'ocean' disappears, when one moves from the global scale to the regional scale. Similar disappearance of the boundaries may occur when zooming-in happens between other scales. Next in FIG. 1C, 'continental setting' unit consists of only 'flood plain' at basin scale, while 'deltaic system' unit comprises 'levees' and 'fluvial channels' at a basin scale. This procedure proceeds for finer scales. For instance in FIG. 1D, 'flood plain' consists of 'flood plain permeable lithological facies' and 'impermeable facies' at a reservoir scale that may be coupled with some geological properties. In FIG. 1E, 'permeable facies' are characterized by some petrophysical properties at a well scale. Preferentially, categorical geological units are modeled at coarser scales, and continuous geological properties are modeled at finer scales when more detailed representation of the model is required. Thus, the geological units of a finer scale are sub-units of geological units at a coarser scale. This scale consistency between geological units should be insured by a chosen modeling method for construction a seamless scaling geomodel. The consistency is governed by a nature of geological processes and graphical representation of the modeled system.

TABLE 1

| Global scale | Regional scale | Basin scale | Reservoir scale | Well scale |
| --- | --- | --- | --- | --- |
| Continent | Continental setting | Flood plain | Flood plain permeable facies | Permeable facies petrophysical properties |
|  |  |  | Flood plain impermeable facies | Impermeable facies petrophysical properties |
|  | Deltaic system | Levees | Levees permeable facies | Permeable facies petrophysical properties |
|  |  |  | Levees impermeable facies | Impermeable facies petrophysical properties |

TABLE 1-continued

| Global scale | Regional scale | Basin scale | Reservoir scale | Well scale |
|---|---|---|---|---|
| | | Fluvial channels | Fluvial channels permeable facies | Permeable facies petrophysical properties |
| | | | Fluvial channels impermeable facies | Impermeable facies petrophysical properties |
| Ocean | Continental shelf/ Shallow marine setting | Shoreface | Shoreface permeable facies | Permeable facies petrophysical properties |
| | | | Shoreface impermeable facies | Impermeable facies petrophysical properties |
| | Deep marine setting | Continental slope break | Continental slope break permeable facies | Permeable facies petrophysical properties |
| | | | Continental slope break impermeable facies | Impermeable facies petrophysical properties |
| | | Offshore | Offshore permeable facies | Permeable facies petrophysical properties |
| | | | Offshore impermeable facies | Impermeable facies petrophysical properties |

Figure 4:
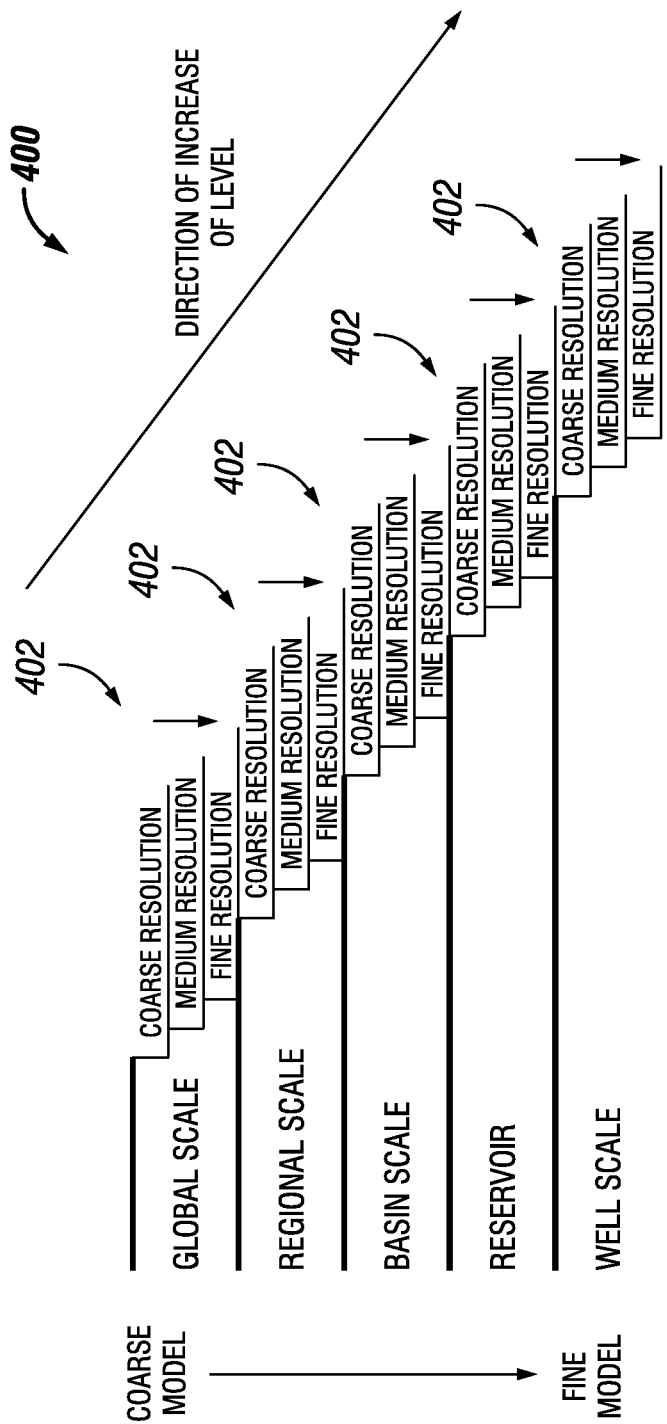
FIG. 4 illustrates scalability and change of graphical resolution in the geomodel.

In addition to a geological scale, there is a graphical resolution. The resolutions of the model differ in amount of detail of the model they retain and show on a screen for certain geological scale. Thus, single geological scale may be represented at various graphical resolutions. All geological units may be retained for various resolutions of single scale. Only the number of the data and level of detail change from one resolution level to another. For example, a shallow marine setting may be from the shore to about 600 ft. (about 183 meters) and a deep marine setting may be from about 600 ft. (about 183 meters) to about 5,900 ft. (about 1800 meters). FIG. 4 shows a stair-like method 400 of the relationship between graphical resolutions and geological scales. Each geological scale may include at least one graphical resolution 402. A transition between the scales and resolutions should be executed as smooth as possible to reflect the nature of the seamless scalable model.

Figure 5:
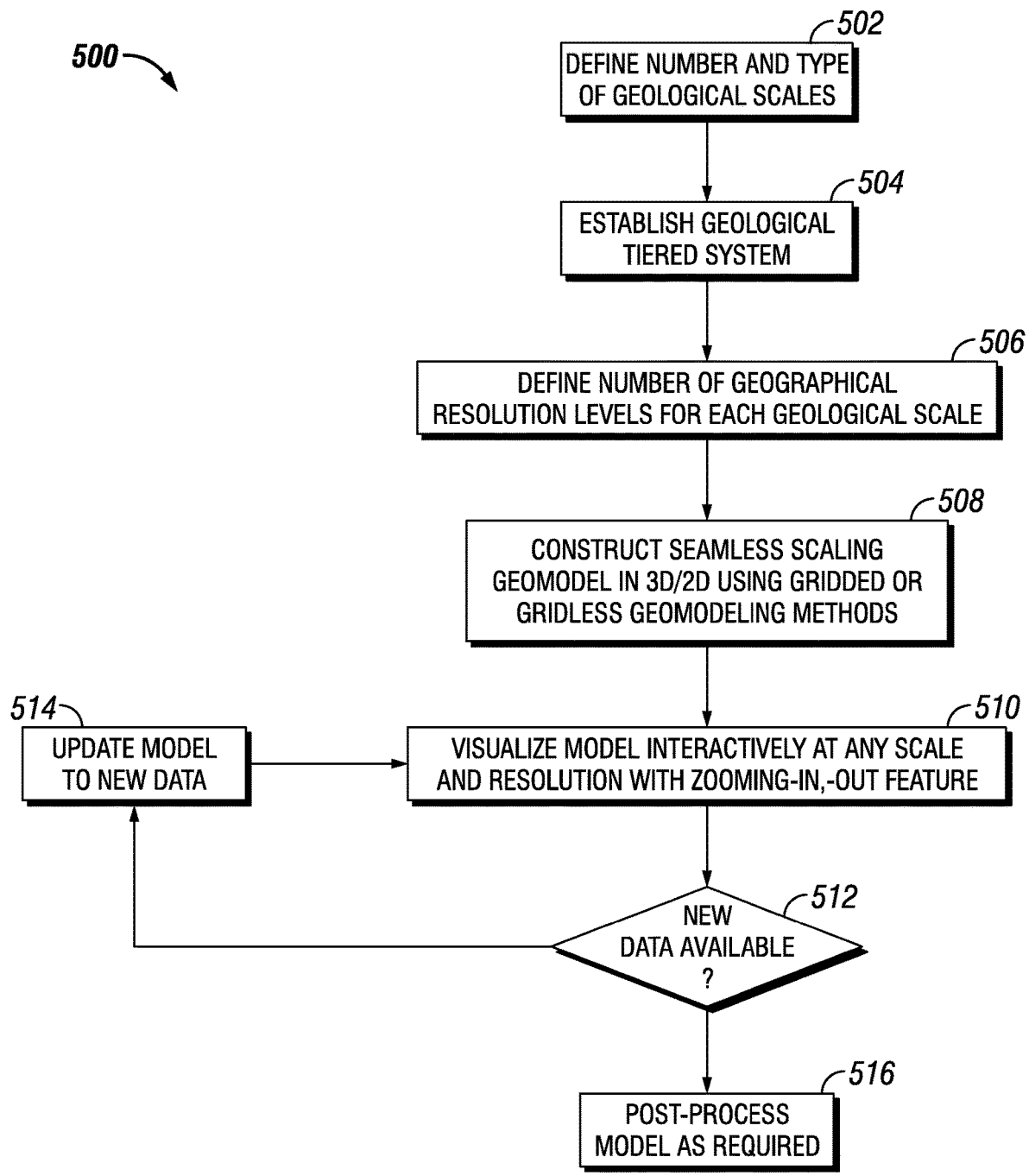
FIG. 5 is a workflow for forming a seamless callable model.

The workflow to construct a seamless scalable geological model may be summarized as in FIG. 5. In FIG. 5, workflow 500 may be processed by information handling system 100 (e.g., referring to FIGS. 1 and 2) to construct a seamless scalable geological model. It should be noted that workflow 500 may be implemented by information handling system 100 as either software which may be disposed on main memory 204 or secondary memory 206 (e.g., referring to FIG. 2). As illustrated in FIG. 5, workflow 500 may begin with step 502, wherein the number and types of the geological scales and relationship between them are defined. After step 502, in step 504 the geological tiered system is established next for each scale. The elements within tiered system should be consistent geologically with each other hierarchically and laterally. In step 506, the number of levels of the graphical resolution is selected and their degree of detail is specified for each scale. In step 508, after the geological scale, the tiered system, and the level of resolutions are confirmed, the seamless scaling geomodel may be constructed using a selected geomodeling technique, e.g. gridless point vector method for modeling categorical variables, like depositional environments or lithological facies, and point cloud method for modeling continuous variables, such as petrophysical properties of the modeled system, may be used for construction a seamless scaling geomodel. Once the model is constructed, in step 510 the model may be visualized on a screen with seamless representation of the geology of the environment under study when zooming-in and zooming-out procedures are performed on the model. In step 512 if new data become available, e.g. by drilling a new well or performing another seismic survey or logging operation, the seamless scaling geomodel may be updated in step 514 to new data, (i.e., new measurements for local or global sites that may update wellbore properties, location of wellbores, formation properties, and/or the like) while preserving the current state of the model. If no new data are available, in step 516 the constructed geomodel may be post-processed for various purposes, e.g. for petroleum exploration, reserve estimation, or used in the flow simulation for the reservoir production forecasting or as input for geomechanical model to control and predict induced fracture propagation during hydraulic fracturing.

Among other things, improvements over current technology include the way the geological model is constructed. The final geomodel contains several sub-models for every defined geological scale and graphical resolution that are consistent with each other from a geological standpoint and, therefore, may be used to address various managerial decision-making tasks in a consistent manner throughout entire cycle of the oil and gas field development from exploration to production.

The preceding description provides various examples of the systems and methods of use disclosed herein which may contain different method steps and alternative combinations of components.

Statement 1. A method for creating a seamless scalable geological model may comprise identifying one or more geological scales; establishing a geological tied system; identifying one or more graphical resolution levels for each of the one or more geological scales; constructing the seamless scalable geological model; and producing a post-process model.

Statement 2. The method of statement 1, further comprising zooming in on the seamless scalable geological model.

Statement 3. The method of statements 1 or 2, further comprising zooming out on the seamless scalable geological model.

Statement 4. The method of statements 1 to 3, wherein the one or more geological scales are a global scale, a regional scale, a basin scale, a reservoir scale, or a well scale.

Statement 5. The method of statement 4, wherein the one or more graphical resolution levels are a coarse resolution, a medium resolution, or a fine resolution.

Statement 6. The method of statement 4, wherein the global scale is a content or an ocean.

Statement 7. The method of statement 4, wherein the regional scale is a deltaic system, a continental shelf, a shallow marine setting, or a deep marine setting.

Statement 8. The method of statement 4, wherein the basin scale is a flood plain, a levee, a fluvial channel, a shoreface, a continental slope break, or an offshore system.

Statement 9. The method of statement 4, wherein the reservoir scale is a flood plain permeable facies, a flood plain impermeable facies, a levee permeable facies, a levee impermeable facie, a fluvial channel permeable facie, a fluvial channel impermeable facie, a shoreface permeable facie, a shoreface impermeable facie, a continental slope break permeable facie, a continental slop break impermeable facie, an offshore permeable facie, or an offshore impermeable facie.

Statement 10. The method of statement 4, wherein the well scale is a permeable facie petrophysical property or an impermeable facie petrophysical property.

Statement 11. The method of statements 1 to 4, further performing drilling operation, stimulation operation, or production operation which produces new data for the geological tied system.

Statement 12. A method for creating a seamless scalable geological model may comprise identifying one or more geological scales; establishing a geological tied system; identifying one or more graphical resolution levels for each of the one or more geological scales, wherein the one or more geological scales are a global scale, a regional scale, a basin scale, a reservoir scale, or a well scale; constructing the seamless scalable geological model; producing a post-process model; and performing drilling operation, stimulation operation, or production operation which produces new data for the geological tied system.

Statement 13. A system for creating a seamless scalable geological model may comprise an information handling system, which may comprise a random access memory; a graphics module; a main memory; a secondary memory; and one or more processors configured to run a software configured to identify one or more geological scales; establish a geological tiered system; identify one or more graphical resolution levels for each of the one or more geological scales; construct the seamless scalable geological model; and produce a post-process model.

Statement 14. The system of statement 13, wherein the one or more processors are further configured to zoom in on the seamless scalable geological model.

Statement 15. The system of statements 13 or 14, wherein the one or more processors are further configured to zoom out on the seamless scalable geological model.

Statement 16. The system of statements 13 to 15, wherein the one or more geological scales are a global scale, a regional scale, a basin scale, a reservoir scale, or a well scale.

Statement 17. The system of statement 16, wherein the one or more graphical resolution levels are a coarse resolution, a medium resolution, or a fine resolution.

Statement 18. The system of statements 13 to 16, wherein the one or more processors are further configured to add new data from a drilling operation, stimulation operation, or production operation.

Statement 19. The system of statement 18, wherein the one or more processors are further configured to update the seamless scalable geological model based at least in part on the new data.

Statement 20. The system of statements 13 to 16 or 18, wherein the software is disposed on the main memory or the secondary memory.

It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for creating a scalable geological model comprising:
   identifying a plurality of geological scales;
   establishing a geological tiered system;
   identifying one or more graphical resolution levels for each geologic scale in the plurality of geological scales;
   assimilating geological data from the plurality of geological scales to form a scalable geological model;
   adding a well scale to the scalable geological model if a petrophysical property is present in a data set, wherein the petrophysical property is a continuous variable;
   utilizing a point cloud method to handle one or more continuous variables;
   utilizing a gridless point vector method to handle one or more categorical variables;
   utilizing the scalable geological model to control and predict induced fracture propagation during a hydraulic fracturing operation; and
   utilizing the scalable geological model to create one or more production forecasts.

2. The method of claim 1, further comprising zooming in on the scalable geological model.

3. The method of claim 1, further comprising zooming out on the scalable geological model.

4. The method of claim 1, wherein the plurality of geological scales are a global scale, a regional scale, a basin scale, a reservoir scale, or the well scale.

5. The method of claim 4, wherein the one or more graphical resolution levels range from a coarse resolution to a fine resolution.

6. The method of claim 4, wherein the global scale comprises a continent or an ocean.

7. The method of claim 4, wherein the regional scale comprises a deltaic system, a continental shelf, a shallow marine setting, or a deep marine setting.

8. The method of claim 4, wherein the basin scale comprises a flood plain, a levee, a fluvial channel, a shoreface, a continental slope break, or an offshore system.

9. The method of claim 4, wherein the reservoir scale comprises a flood plain permeable facies, a flood plain impermeable facies, a levee permeable facies, a levee impermeable facie, a fluvial channel permeable facie, a fluvial channel impermeable facie, a shoreface permeable facie, a shoreface impermeable facie, a continental slope break permeable facie, a continental slope break impermeable facie, an offshore permeable facie, or an offshore impermeable facie.

10. The method of claim 4, wherein the well scale comprises a permeable facie petrophysical property or an impermeable facie petrophysical property.

11. The method of claim 1, further comprising performing a drilling operation, stimulation operation, or production operation which produces new data for the geological tiered system.

12. A method for creating a scalable geological model comprising:
    identifying a plurality of geological scales;
    establishing a geological tiered system;
    identifying one or more graphical resolution levels for each geologic scale in the plurality of geological scales, wherein the one or more geological scales are a global scale, a regional scale, a basin scale, a reservoir scale, or a well scale;
    utilizing a gridless point vector method to handle categorical variables;
    utilizing a point cloud method to handle continuous variables;
    utilizing the scalable geological model to control and predict induced fracture propagation during a hydraulic fracturing operation; and
    utilizing the scalable geological model to create one or more production forecasts.

13. A system for creating a scalable geological model comprising:
    an information handling system comprising:
    a random access memory;
    a graphics module;
    a main memory;
    a secondary memory; and
    one or more processors configured to run a software to:
    identify a plurality of geological scales;
    establish a geological tiered system;
    identify one or more graphical resolution levels for each geologic scale in the plurality of geological scales;
    assimilate geological data from the plurality of geological scales to form a scalable geological model;
    handle categorical variables with a gridless point vector method;
    handle continuous variables with a point cloud method;
    add a well scale to the scalable geological model if a petrophysical property is present in a data set;
    use the scalable geological model to control and predict induced fracture propagation during a hydraulic fracturing operation; and
    use the scalable geological model to create one or more production forecasts.

14. The system of claim 13, wherein the one or more processors are further configured to zoom in on the scalable geological model.

15. The system of claim 13, wherein the one or more processors are further configured to zoom out on the scalable geological model.

16. The system of claim 13, wherein the one or more geological scales are a global scale, a regional scale, a basin scale, a reservoir scale, or the well scale.

17. The system of claim 16, wherein the one or more graphical resolution levels range from a coarse resolution to a fine resolution.

18. The system of claim 13, wherein the one or more processors are further configured to add new data from a drilling operation, stimulation operation, or production operation.

19. The system of claim 18, wherein the one or more processors are further configured to update the scalable geological model based at least in part on the new data.

20. The system of claim 13, wherein the software is disposed on the main memory or the secondary memory.

* * * * *